US012785177B2

(12) United States Patent
Kang et al.

(10) Patent No.: US 12,785,177 B2
(45) Date of Patent: Nov. 3, 2026

(54) BATTERY CELL INCLUDING SEALED PORTION HAVING EMBOSSED PATTERN FORMED THEREON AND SEALING BLOCK FOR MANUFACTURING THE SAME

(71) Applicant: LG Energy Solution, Ltd., Seoul (KR)

(72) Inventors: Gyung Soo Kang, Daejeon (KR); Jae Ho Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 663 days.

(21) Appl. No.: 18/266,132

(22) PCT Filed: Oct. 18, 2022

(86) PCT No.: PCT/KR2022/015812
§ 371 (c)(1),
(2) Date: Jun. 8, 2023

(87) PCT Pub. No.: WO2023/068725
PCT Pub. Date: Apr. 27, 2023

(65) Prior Publication Data

US 2024/0097245 A1 Mar. 21, 2024

(30) Foreign Application Priority Data

Oct. 18, 2021 (KR) ........................ 10-2021-0138266

(51) Int. Cl.
*H01M 50/105* (2021.01)
*H01M 10/04* (2006.01)

(52) U.S. Cl.
CPC ..... *H01M 50/105* (2021.01); *H01M 10/0404* (2013.01); *H01M 10/0481* (2013.01)

(58) Field of Classification Search
None
See application file for complete search history.

(56) References Cited

U.S. PATENT DOCUMENTS

| | | | |
|---|---|---|---|
| 2006/0093905 | A1 | 5/2006 | Kim |
| 2007/0009795 | A1 | 1/2007 | Otohata et al. |
| 2011/0014516 | A1 | 1/2011 | Roh et al. |
| 2011/0244315 | A1 | 10/2011 | Yoon |
| 2014/0182119 | A1 | 7/2014 | Otohata et al. |
| 2015/0349375 | A1 | 12/2015 | Takahashi et al. |
| 2016/0043359 | A1 | 2/2016 | Miyake |

(Continued)

FOREIGN PATENT DOCUMENTS

| | | | |
|---|---|---|---|
| CN | 112490491 | A | 3/2021 |
| CN | 113394491 | A | 9/2021 |

(Continued)

OTHER PUBLICATIONS

International Search Report for PCT/KR2022/015812 mailed Jan. 26, 2023. 3 pgs.

*Primary Examiner* — Tracy M Dove
(74) *Attorney, Agent, or Firm* — Lerner David LLP

(57) ABSTRACT

The present invention relates to a battery cell including a pouch-shaped battery case configured to receive an electrode assembly therein. The pouch-shaped battery case is provided at an outer periphery thereof surrounding an electrode assembly receiving portion with a sealed portion, and an embossed pattern is formed on the sealed portion in all directions. Thus, it is possible to increase sealing force of a pouch-shaped battery cell without the addition of a separate battery cell manufacturing process.

11 Claims, 11 Drawing Sheets

(56) References Cited

U.S. PATENT DOCUMENTS

| | | | |
|---|---|---|---|
| 2017/0256756 A1 | 9/2017 | Miyake | |
| 2017/0263972 A1 | 9/2017 | Rho et al. | |
| 2020/0112001 A1 | 4/2020 | Jung et al. | |
| 2021/0283671 A1 | 9/2021 | Kotik et al. | |

FOREIGN PATENT DOCUMENTS

| | | | |
|---|---|---|---|
| JP | 2001052748 | A | 2/2001 |
| JP | 200495401 | A | 3/2004 |
| JP | 2006093120 | A | 4/2006 |
| JP | 2013157286 | A | 8/2013 |
| JP | 2020524885 | A | 8/2020 |
| KR | 20060064686 | A | 6/2006 |
| KR | 20110006524 | A | 1/2011 |
| KR | 101296949 | B1 | 8/2013 |
| KR | 20160018389 | A | 2/2016 |
| KR | 20160075068 | A | 6/2016 |
| KR | 101680592 | B1 | 11/2016 |
| KR | 20180028714 | A | 3/2018 |
| KR | 102208998 | B1 | 1/2021 |
| KR | 20210043481 | A | 4/2021 |

【FIG. 1】
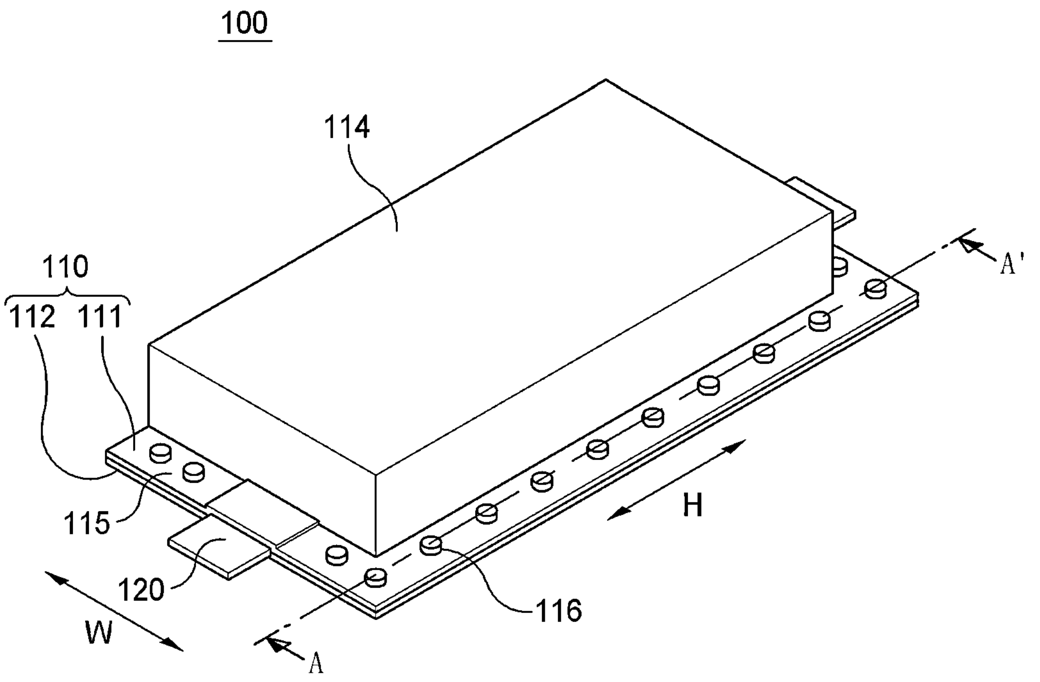
【FIG. 2】
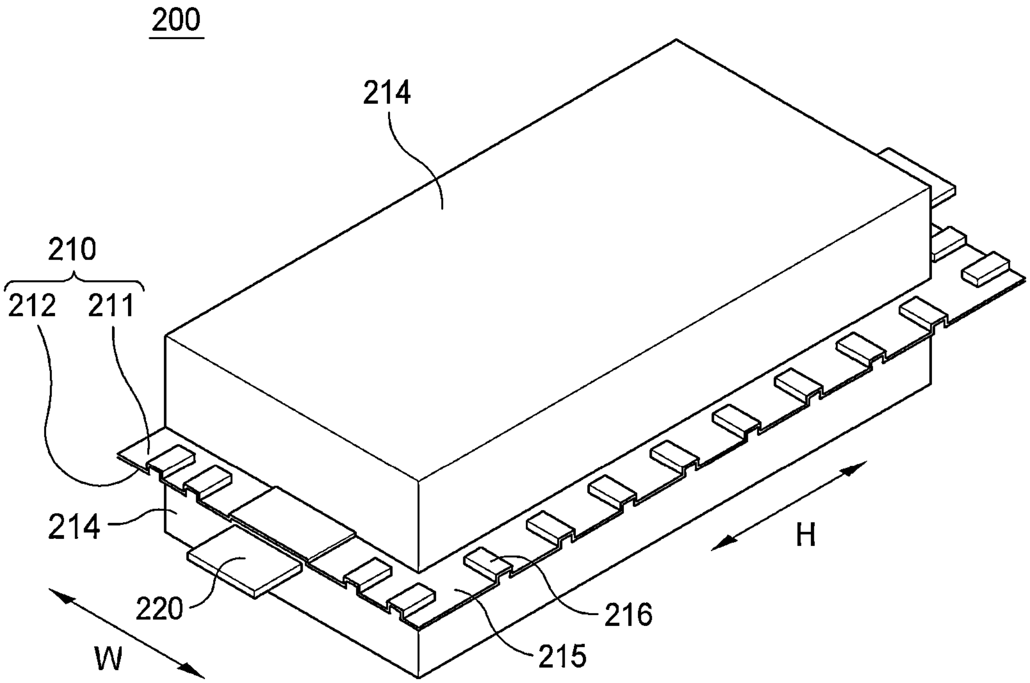

【FIG. 3】
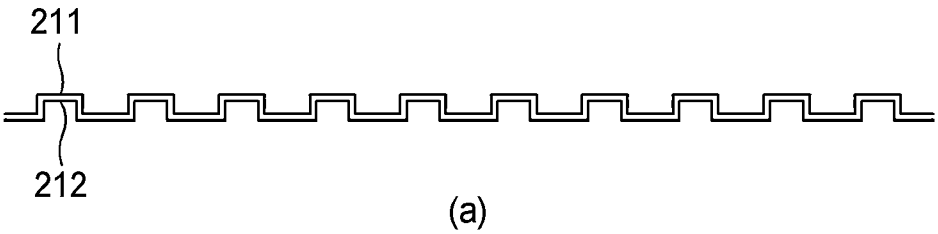
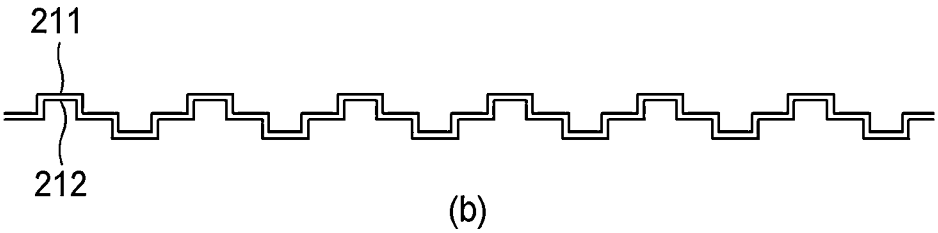
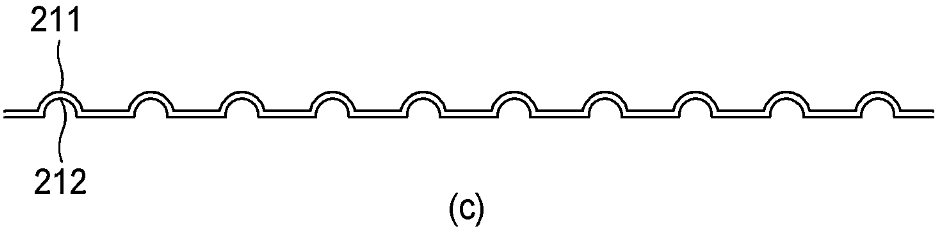
【FIG. 4】
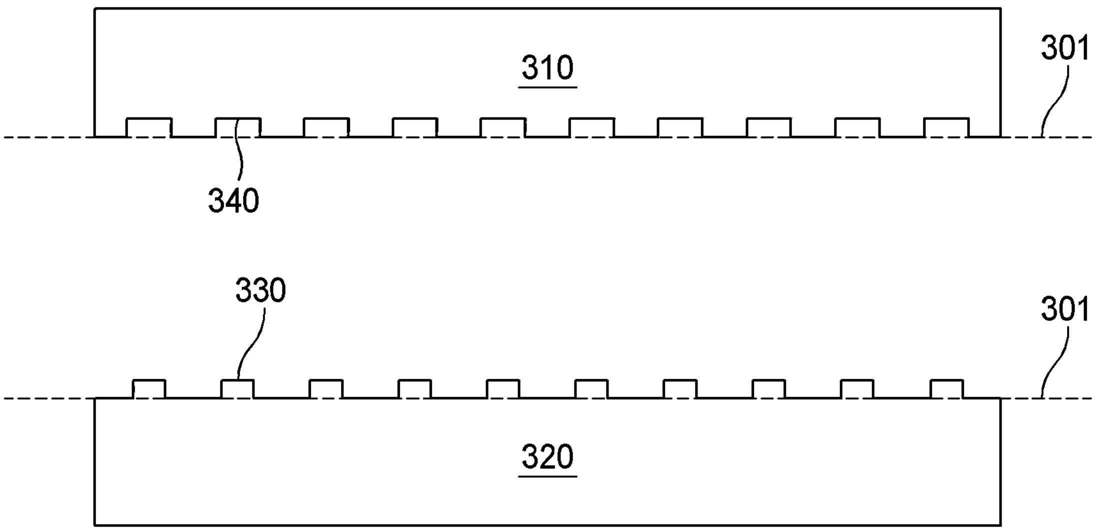

【FIG. 5】
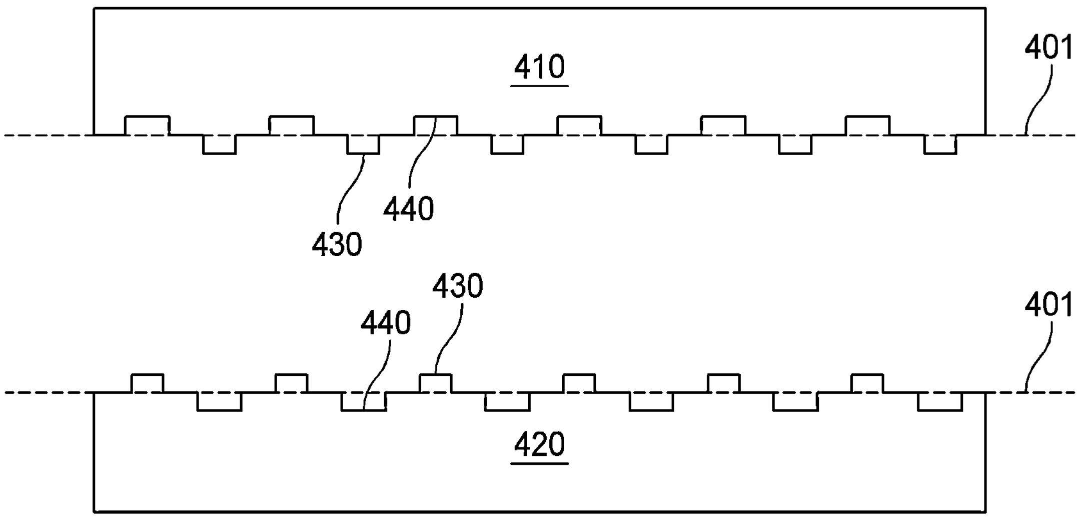

【FIG. 6】
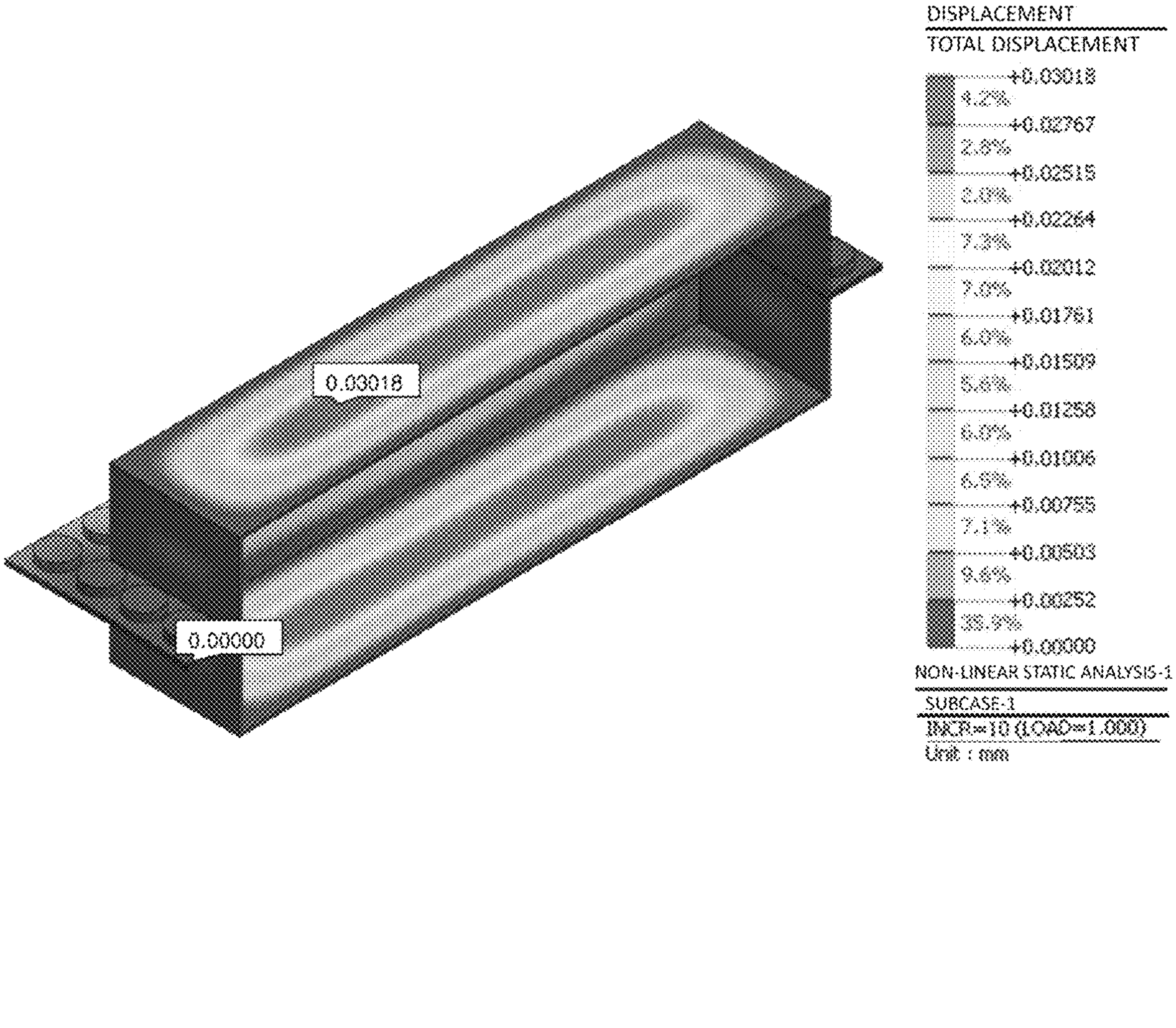

【FIG. 7】
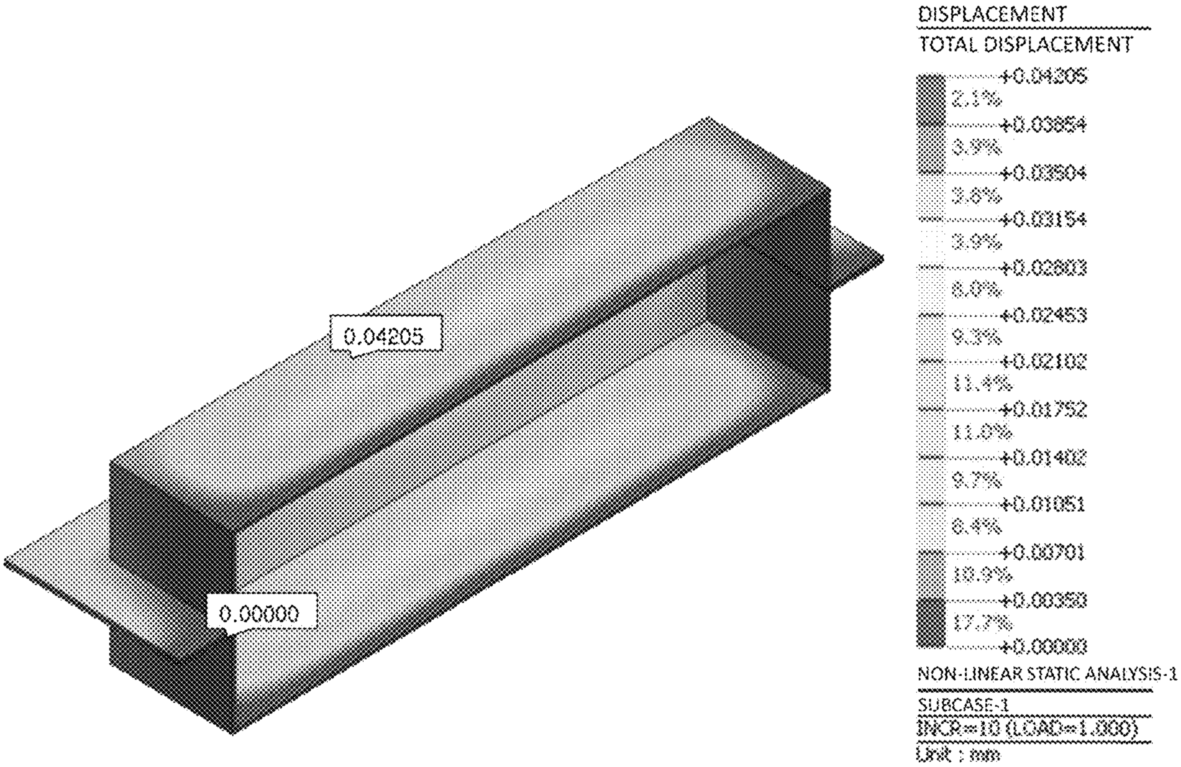

【FIG. 8】
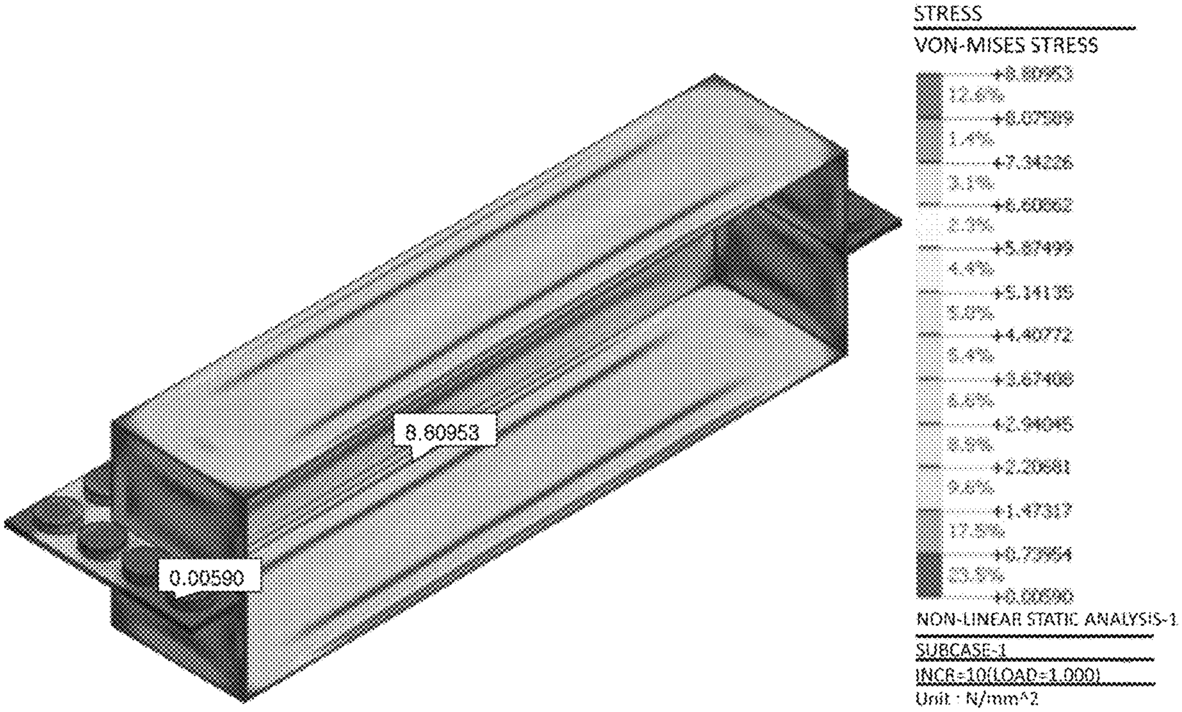

【FIG. 9】
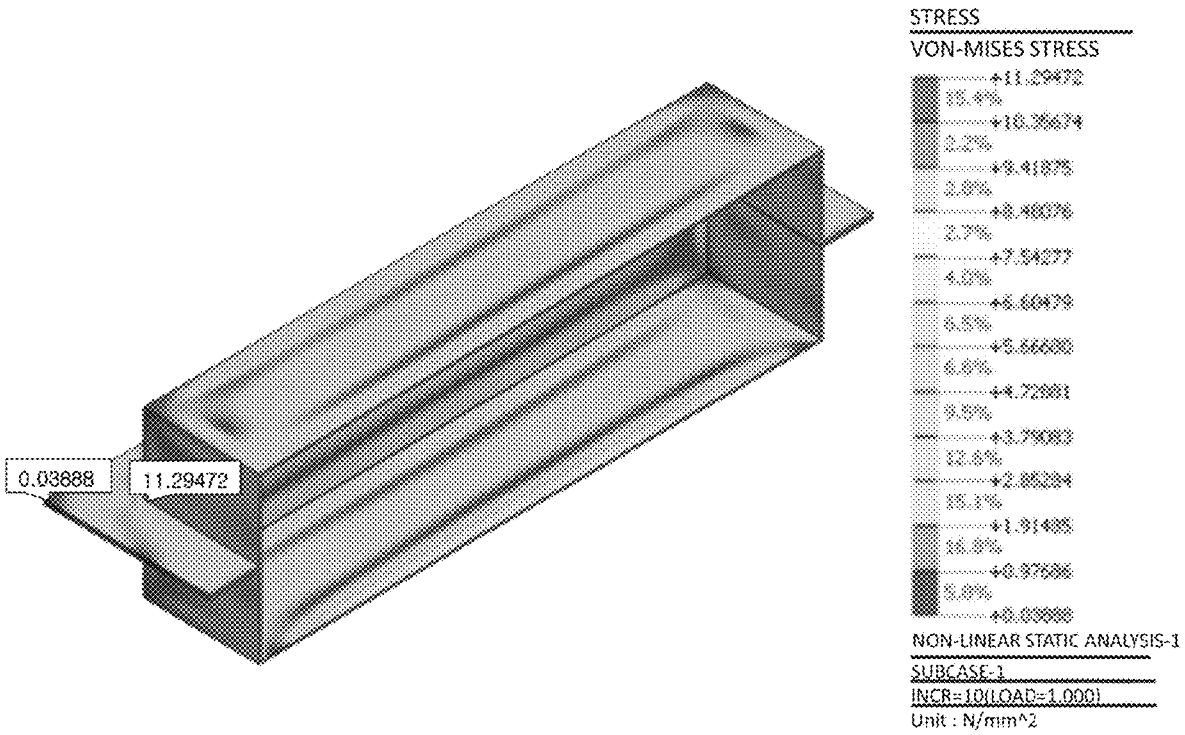

【FIG. 10】
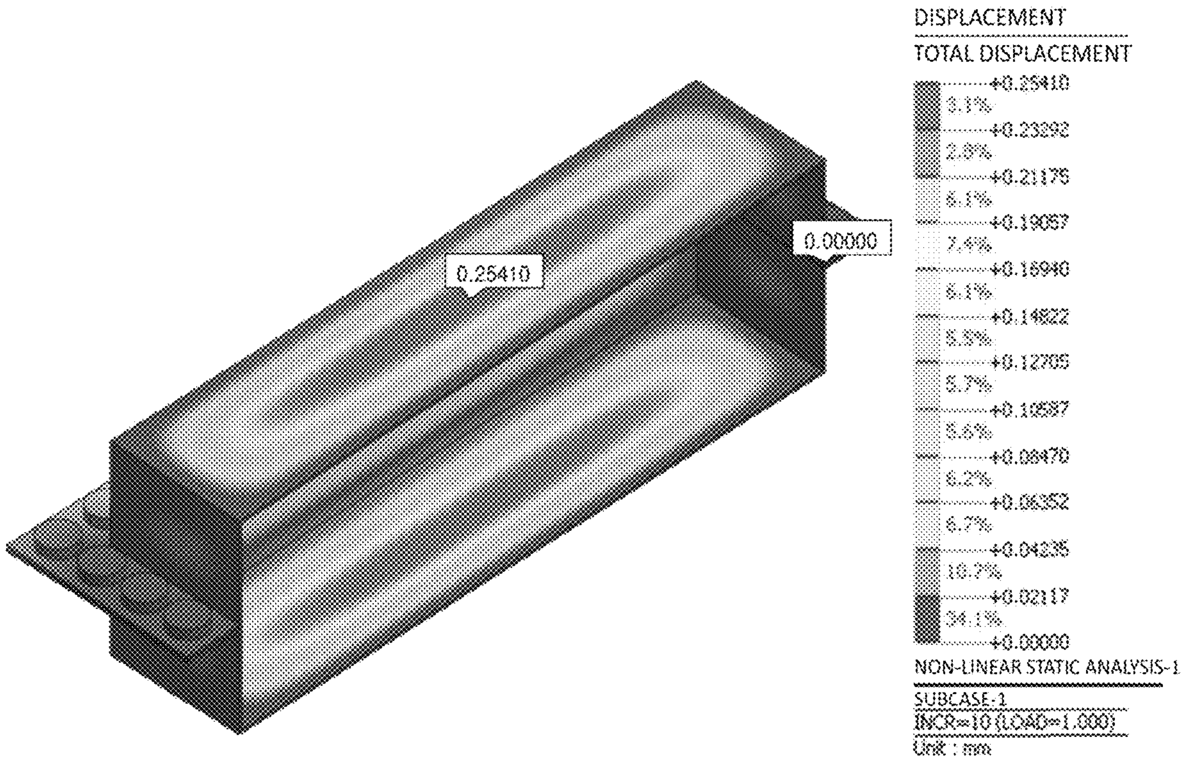

【FIG. 11】
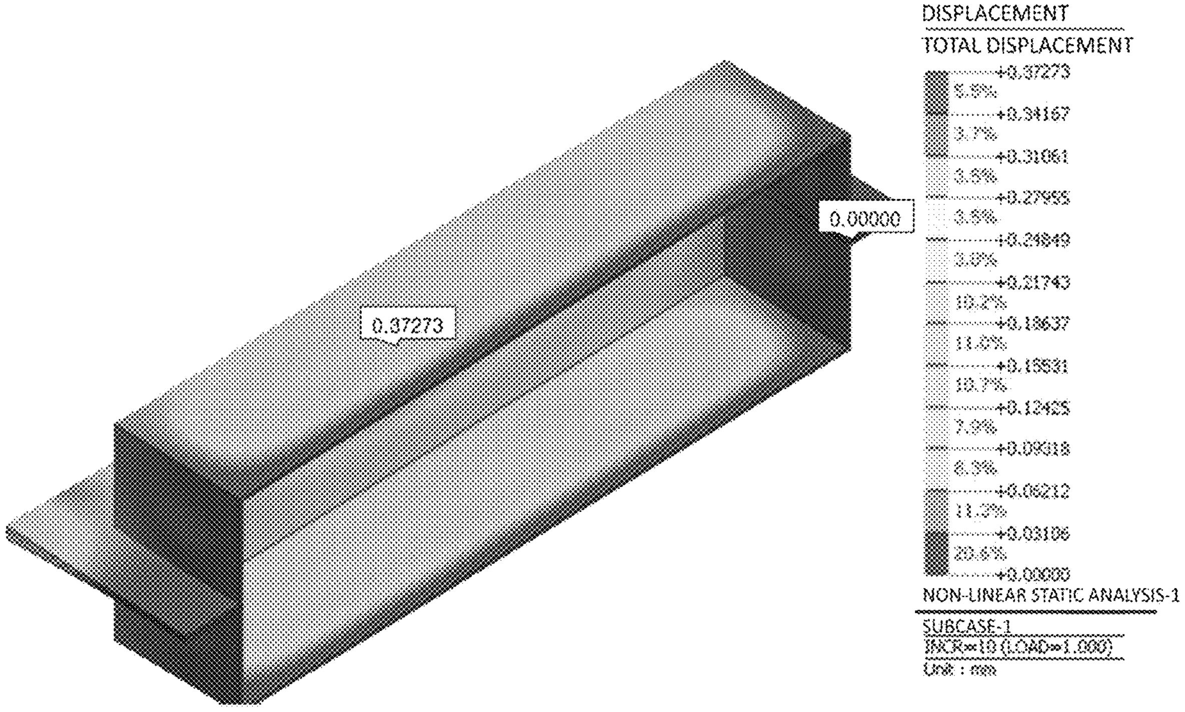

【FIG. 12】
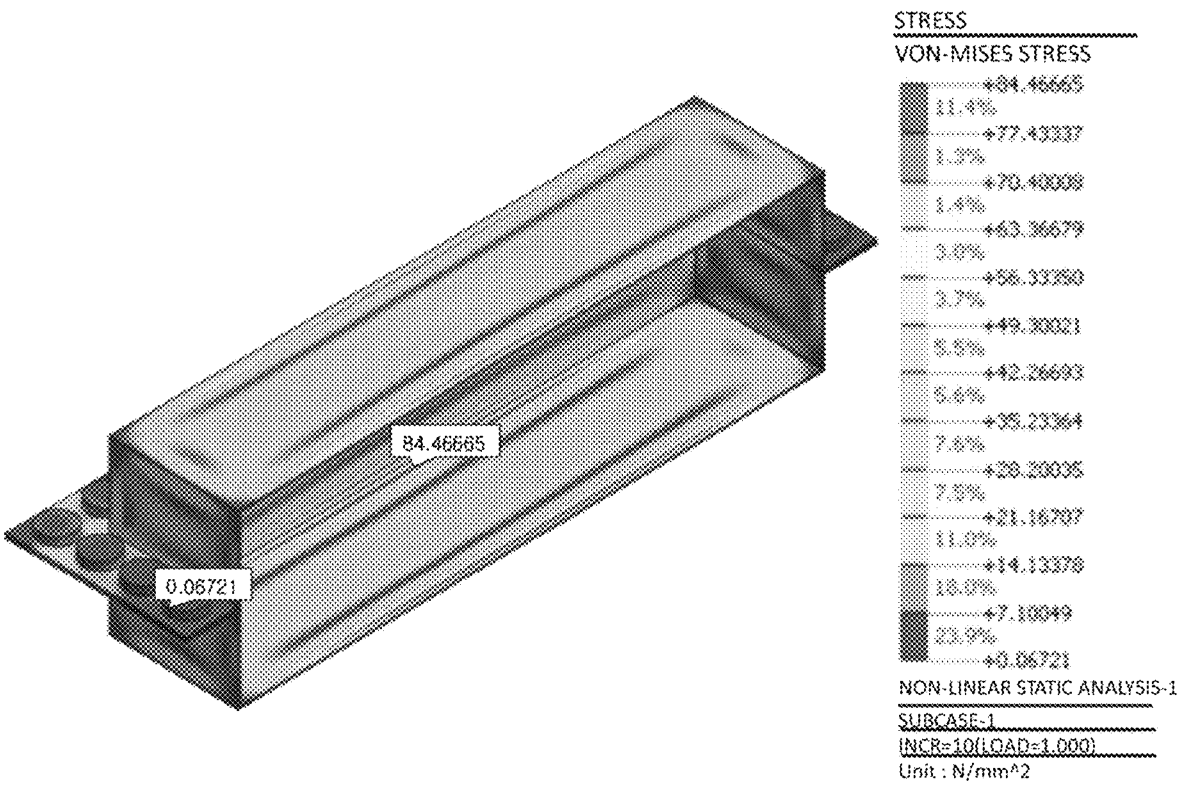

【FIG. 13】
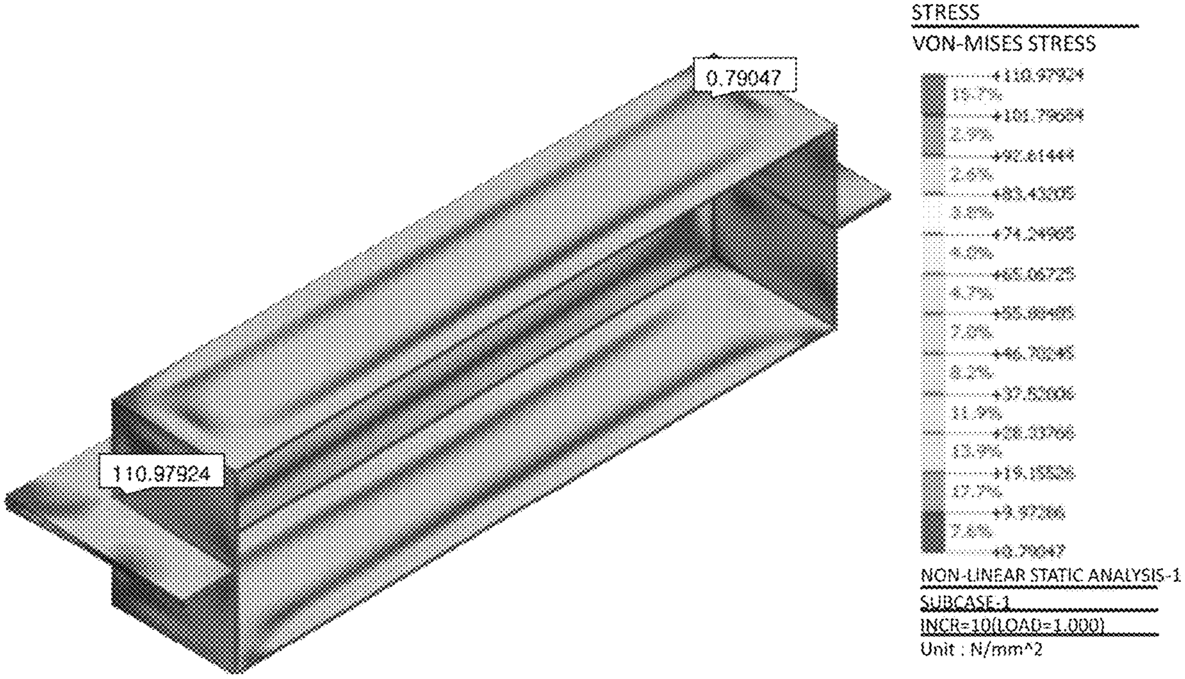

BATTERY CELL INCLUDING SEALED PORTION HAVING EMBOSSED PATTERN FORMED THEREON AND SEALING BLOCK FOR MANUFACTURING THE SAME

CROSS-REFERENCE TO RELATED APPLICATIONS

This application is a national phase entry under 35 U.S.S. § 317 of International Application No. PCT/KR2022/015812 filed on Oct. 18, 2022, which claims the benefit of priority to Korean Patent Application No. 10-2021-0138266 filed on Oct. 18, 2021, each of which is incorporated herein by reference in their entireties.

TECHNICAL FIELD

The present invention relates to a battery cell including a sealed portion having an embossed pattern formed thereon and a sealing block for manufacturing the same. More particularly, the present invention relates to a battery cell including a sealed portion having an embossed pattern formed thereon, wherein the embossed pattern is configured to prevent easy venting of a sealed portion of a pouch-shaped battery cell, and a sealing block for manufacturing the same.

BACKGROUND ART

A lithium secondary battery, which is capable of being charged and discharged, has been widely used as an energy source for wireless mobile devices or wearable devices, which are worn on bodies, and has also been used as an energy source for electric vehicles and hybrid electric vehicles presented as alternatives to existing gasoline and diesel vehicles, which cause air pollution.

Depending on the material and shape of a battery case, the lithium secondary battery may be classified as a cylindrical battery cell having an electrode assembly mounted in a metal can, a prismatic battery cell having an electrode assembly mounted in a metal can, or a pouch-shaped battery cell having an electrode assembly mounted in a battery case made of a laminate sheet. The pouch-shaped battery cell has advantages of easy deformation and high energy density.

In order to seal the pouch-shaped battery cell, a method of pressing an outer periphery of the battery case using a high-temperature sealing block to form a sealed portion is used. If such a sealing method is used, however, venting of the pouch-shaped battery cell easily occurs when internal pressure of the pouch-shaped battery cell is increased.

Accordingly, methods of improving sealability of the pouch-shaped battery cell have been devised.

Patent Document 1 discloses a power storage device configured such that, in a sealed container formed of a power storage device sheathing member including a metal foil layer, an anti-corrosion treatment layer, and a sealant layer, which are sequentially stacked, an edge portion at which the sealant layers contact each other is sealed by thermal sealing, and a thin concave portion is formed at the edge portion.

In Patent Document 1, the thin portion is formed at the sealed portion formed by thermal sealing, whereby the edge portion is easily bent.

Patent Document 2 discloses a film coated battery including a sheathing film configured such that at least a thermally fusible resin layer and a metal thin film layer are stacked, a battery element is surrounded in the state in which the thermally fusible resin layer faces inside, and a peripheral joining portion is thermally fused to seal the battery element, wherein at least one bent portion is formed at the joining portion, and the thickness of the bent portion is less than the thickness of the joining portion around the bent portion.

In Patent Document 2, the bent portion having a relatively small thickness is formed at the joining portion of the sheathing film, whereby formation of cracks at the bent portion due to difference in extension of the film inside and outside the joining portion is prevented.

Patent Document 3 discloses a sealing device for performing preliminary sealing, the preliminary sealing and main sealing being sequentially performed in order to seal a pouch-shaped battery case, wherein the sealing device includes a press configured to heat and press one surface and the other surface of an outer periphery of a sheet member for battery cases in order to form a preliminary sealed portion and a pair of sealing blocks, each including a fixing portion configured to fix the sheet member, a sealing protrusion is formed on the press so as to protrude outwards, and an outer end of the sealing protrusion is round when viewed in vertical section.

In Patent Document 3, the preliminary sealing is performed before the main sealing, whereby formation of wrinkles on an outer surface of a battery cell is reduced.

However, the above patent documents do not suggest technology capable of easily providing a structure capable of increasing sealing force of a pouch-shaped battery cell, and therefore there is a need to develop such technology.

PRIOR ART DOCUMENTS (Patent Document 1) Japanese Patent Application Publication No. 2013-157286 (2013 Aug. 15)

(Patent Document 2) Korean Patent Application Publication No. 2006-0064686 (2006 Apr. 18)

(Patent Document 3) Korean Patent Application Publication No. 2018-0028714 (2018 Mar. 19)

DISCLOSURE

Technical Problem

The present invention has been made in view of the above problems, and it is an object of the present invention to provide a battery cell including a sealed portion having an embossed pattern formed thereon such that a structure in which sealing force of a sealed portion of a pouch-shaped battery cell is increased is applicable using a simple method.

Technical Solution

A battery cell according to the present invention to accomplish the above object includes a pouch-shaped battery case configured to receive an electrode assembly therein, wherein the pouch-shaped battery case is provided at an outer periphery thereof surrounding an electrode assembly receiving portion with a sealed portion, and an embossed pattern is formed on the sealed portion in all directions.

The embossed pattern may be formed such that reliefs when viewed from above the sealed portion are intaglios when viewed from under the sealed portion and such that intaglios when viewed from above the sealed portion are reliefs when viewed from under the sealed portion.

The embossed pattern may be formed such that the reliefs and the intaglios are alternately repeated when viewed from above the sealed portion.

The embossed pattern may be formed at regular intervals while having regular sizes.

The intervals of the embossed pattern formed on the sealed portion in a direction in which an electrode lead protrudes may be less than the intervals of the embossed pattern formed on the sealed portion in a direction in which no electrode lead protrudes.

The vertical section of the embossed pattern may be polygonal, semicircular, or semielliptical.

The present invention provides a sealing block for manufacturing the battery cell. Specifically, the sealing block includes an upper sealing block disposed above a sealed portion of a pouch-shaped battery cell and a lower sealing block disposed under the sealed portion of the pouch-shaped battery cell, wherein the upper sealing block and the lower sealing block are provided with recesses and protrusions configured to be engaged with each other at positions at which the upper sealing block and the lower sealing block correspond to each other.

The protrusions may protrude toward the sealed portion of the pouch-shaped battery cell.

Alternatively, the protrusions may be configured such that shapes protruding upwards toward the sealed portion of the pouch-shaped battery cell and shapes protruding downwards toward the sealed portion of the pouch-shaped battery cell are alternately repeatedly arranged.

The present invention provides a battery module including the battery cell as a unit battery.

In addition, the present invention may provide various combinations of the above solving means.

Advantageous Effects

As is apparent from the above description, a battery cell according to the present invention is configured such that an embossed pattern is formed on the entirety of a sealed portion, whereby the total surface area of the sealed portion is increased. Consequently, contact area between an upper case and a lower case may be increased, and therefore sealing force of the battery cell may be increased.

Even when a pouch-shaped battery cell is deformed, therefore, it is possible to prevent opening of the sealed portion, and even when internal pressure of the battery cell is increased, it is possible to inhibit explosion of the battery cell.

In addition, it is possible to form the embossed pattern on the sealed portion during a conventional battery cell manufacturing process, and therefore expansion of production facilities is unnecessary.

DESCRIPTION OF DRAWINGS

FIG. 1 is a perspective view of a battery cell according to a first embodiment.

FIG. 2 is a perspective view of a battery cell according to a second embodiment.

FIG. 3 is a vertical sectional view of a sealed portion of a battery cell.

FIG. 4 is a vertical sectional view of a sealing block according to a third embodiment.

FIG. 5 is a vertical sectional view of a sealing block according to a fourth embodiment.

FIG. 6 is a view showing the results of the maximum deformation amount structure simulation when an internal pressure of 0.01 MPa was applied to Experimental Example 1.

FIG. 7 is a view showing the results of the maximum deformation amount structure simulation when an internal pressure of 0.01 MPa was applied to Experimental Example 2.

FIG. 8 is a view showing the results of the maximum stress structure simulation when an internal pressure of 0.01 MPa was applied to Experimental Example 1.

FIG. 9 is a view showing the results of the maximum stress structure simulation when an internal pressure of 0.01 MPa was applied to Experimental Example 2.

FIG. 10 is a view showing the results of the maximum deformation amount structure simulation when an internal pressure of 0.1 MPa was applied to Experimental Example 1.

FIG. 11 is a view showing the results of the maximum deformation amount structure simulation when an internal pressure of 0.1 MPa was applied to Experimental Example 2.

FIG. 12 is a view showing the results of the maximum stress structure simulation when an internal pressure of 0.1 MPa was applied to Experimental Example 1.

FIG. 13 is a view showing the results of the maximum stress structure simulation when an internal pressure of 0.1 MPa was applied to Experimental Example 2.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Embodiments of the present invention will be described in detail with reference to the accompanying drawings.

FIG. 1 is a perspective view of a battery cell according to a first embodiment.

The battery cell 100 is a pouch-shaped battery cell including a pouch-shaped battery case 110 made of a laminate sheet. The pouch-shaped battery case 110 includes an upper case 111 having an electrode assembly receiving portion 114 configured to receive an electrode assembly formed therein and a lower case 112 located under the upper case 111.

The battery case may be made of a laminate sheet configured such that an outer resin layer, an air and moisture blocking metal layer, and a thermally fusible inner resin layer are stacked.

It is required for the outer resin layer to exhibit excellent tolerance to an external environment, and therefore more than predetermined tensile strength and weather resistance are necessary. For example, the outer resin layer may include polyethylene naphthalate (PEN), polyethylene terephthalate (PET), or oriented nylon.

The metal layer may be made of aluminum (Al) or an aluminum alloy in order to exhibit a function of improving strength of the battery case in addition to a function of preventing introduction of foreign matter, such as gas and moisture, or leakage of an electrolytic solution.

A polymer resin that exhibits thermal fusibility, has low hygroscopicity to the electrolytic solution, and is not expanded or eroded by the electrolytic solution may be used as the inner resin layer. For example, the inner resin layer may be made of a cast polypropylene (CPP) film.

The upper case 111 and the lower case 112 contact each other at outer peripheries thereof that surround the electrode assembly receiving portion. When the outer peripheries are heated and pressed, the inner resin layer of the upper case and the inner resin layer of the lower case are melted and coupled to each other to form a sealed portion 115.

In the battery cell 100, the upper case 111 and the lower case 112 are connected to each other, and the sealed portion 115 is formed at three direction outer peripheries thereof excluding a bent portion.

That is, the sealed portion formed at the three-way outer peripheries includes overall width direction (W) sealed portions located at opposite ends of the battery cell and an overall length direction (H) sealed portion, and an embossed pattern 116 is formed on all of the sealed portions.

The embossed pattern 116 may be formed on all of the sealed portions so as to have regular sizes and to be disposed at regular intervals such that all of the sealed portions have the same sealing force.

Alternatively, since internal pressure is most greatly increased in an overall length direction middle part of the overall length direction (H) sealed portion, the embossed pattern may be formed on the overall length direction middle part at smaller intervals.

Alternatively, electrode leads 120 extend outwards from the battery case at the overall width direction (W) sealed portions, and sealing force at parts from which the electrode leads 120 protrude is further reduced. In order to prevent reduction in sealing force at the parts from which the electrode leads 120 protrude, therefore, the embossed pattern formed on the sealed portions in directions in which the electrode leads 120 protrude may be formed at smaller intervals than the embossed pattern formed on the sealed portion in a direction in which the electrode leads 120 do not protrude. This construction may also be equally applied to a unidirectional battery cell configured such that electrode leads protrude from one direction sealed portion.

The embossed pattern formed on the battery cell 100 generally has a cylindrical shape and a circular shape when viewed in plan. However, the shape of the embossed pattern is not particularly restricted as long as it is possible to increase the adhesion area between the upper case and the lower case. For example, the vertical section of the embossed pattern may be polygonal, semicircular, or semielliptical.

In the present invention, the embossed pattern is formed in order to increase the adhesion area of the battery case on the sealed portion. The embossed pattern may be formed such that relief parts when viewed from above the sealed portion are intaglio parts when viewed from under the sealed portion and such that intaglio parts when viewed from above the sealed portion are relief parts when viewed from under the sealed portion.

FIG. 2 is a perspective view of a battery cell according to a second embodiment.

Referring to FIG. 2, an upper case 211 and a lower case 212 constituting a pouch-shaped battery case 210 of the battery cell 200 are shown as being spaced apart from each other for convenience of description; however, the upper case 211 and the lower case 212 are brought into tight contact with each other by thermal fusion.

The battery cell 200 is configured to have a structure in which an electrode assembly receiving portion 214 is formed in each of the upper case 211 and the lower case 212 in order to receive a bidirectional electrode assembly having electrode leads 220 protruding in opposite directions, which may be more suitable to manufacture a high-capacity battery cell.

The battery cell 200 is different in shape of an embossed pattern from the battery cell 100. Specifically, the embossed pattern 216 generally has a quadrangular prism shape and a quadrangular shape when viewed in plan. In addition, the embossed pattern 216 is formed up to the end of a sealed portion. Consequently, the adhesion area between the upper case 211 and the lower case 212 on the sealed portion 215 may be wider, whereby sealing force may be further improved.

Meanwhile, the battery cell 200 is configured such that the embossed pattern formed on the overall width direction (W) sealed portion and the embossed pattern formed on the overall length direction (H) sealed portion are different in size and interval from each other. Consequently, it is possible to freely set the size and interval of the embossed pattern in order to secure desired sealing force.

A description of the battery cell 100 may be equally applied to the other parts of the battery cell 200, and therefore a detailed description thereof will be omitted.

FIG. 3 is a vertical sectional view of a sealed portion of a battery cell.

Referring to FIG. 3, three types of embossed patterns are shown. For convenience of understanding, the upper case 211 and the lower case 212 are shown as being spaced apart from each other; however, these cases are brought into tight contact with each other without being spaced apart from each other to form a sealed portion.

The embossed pattern shown in (a) of FIG. 3 is configured such that polygonal shapes when viewed in vertical section are formed at regular intervals while having regular sizes, such that relief parts when viewed from above the sealed portion are intaglio parts when viewed from under the sealed portion, and such that intaglio parts when viewed from above the sealed portion are relief parts when viewed from under the sealed portion.

The embossed pattern shown in (b) of FIG. 3 is configured such that polygonal shapes when viewed in vertical section are formed at regular intervals while having regular sizes, such that reliefs and intaglios are alternately repeated when viewed from above the sealed portion, and such that intaglios and reliefs are alternately repeated when viewed from under the sealed portion at positions corresponding to the reliefs and the intaglios.

The embossed pattern shown in (c) of FIG. 3 is configured such that semicircular shapes when viewed in vertical section are formed at regular intervals while having regular sizes, such that the semicircular shapes are reliefs when viewed from above the sealed portion, and such that the semicircular shapes are intaglios when viewed from under the sealed portion.

The embossed pattern according to the present invention is not limited to the shapes shown in FIG. 3, and the embossed pattern may be formed at various intervals while having various shapes.

FIG. 4 is a vertical sectional view of a sealing block according to a third embodiment.

Referring to FIG. 4, the sealing block according to the third embodiment is suitable for forming the embossed pattern shown in (a) of FIG. 3. The sealing block according to the third embodiment includes an upper sealing block 310 disposed above a sealed portion of a pouch-shaped battery cell and a lower sealing block 320 disposed under the sealed portion of the pouch-shaped battery cell.

The upper sealing block 310 and the lower sealing block 320 are configured to be engaged with each other at positions at which the upper sealing block and the lower sealing block correspond to each other. Concave recesses 340 are formed based on a sealing surface 301, and convex protrusions 330 are formed based on the sealing surface 301.

When the sealed portion of the pouch-shaped battery cell is disposed between the upper sealing block 310 and the lower sealing block 320 and the sealed portion is pressed and heated, the embossed pattern shown in (a) of FIG. 3 is formed. The protrusions 330 may protrude toward the sealed portion of the pouch-shaped battery cell.

FIG. 5 is a vertical sectional view of a sealing block according to a fourth embodiment.

Referring to FIG. 5, the sealing block according to the fourth embodiment is suitable for forming the embossed pattern shown in (b) of FIG. 3. The sealing block according to the fourth embodiment includes an upper sealing block 410 disposed above a sealed portion of a pouch-shaped battery cell and a lower sealing block 420 disposed under the sealed portion of the pouch-shaped battery cell.

The upper sealing block 410 and the lower sealing block 420 are configured to be engaged with each other at positions at which the upper sealing block and the lower sealing block correspond to each other. Concave recesses 440 are formed based on a sealing surface 401, and convex protrusions 430 are formed based on the sealing surface 401.

The protrusions 430 are configured such that portions protruding upwards toward the sealed portion of the pouch-shaped battery cell and portions protruding downwards toward the sealed portion of the pouch-shaped battery cell are alternately repeatedly arranged, and the recesses 440 are formed in the sealing blocks that face each other so as to be engaged with the protrusions 430.

In the battery cell according to the present invention, the sealing force of the sealed portion is increased. In a battery module including the battery cell as a unit battery, therefore, the battery cell may not be vented even at larger internal pressure. Consequently, safety of the battery module may be improved.

Hereinafter, the present invention will be described with reference to examples. These examples are provided only for easier understanding of the present invention and should not be construed as limiting the scope of the present invention.

Experimental Example 1

A pouch-shaped battery cell was prepared, and an outer periphery of the pouch-shaped battery cell was sealed such that an embossed pattern was formed on the entirety of the sealed portion.

Experimental Example 2

A pouch-shaped battery cell was prepared, and an outer periphery of the pouch-shaped battery cell was sealed such that the sealed portion was flat.

<Maximum Deformation Amount and Maximum Stress Measurement 1>

The maximum deformation amount and the maximum stress of each of the battery cells manufactured according to Experimental Example 1 and Experimental Example 2 were measured while an internal pressure of 0.01 MPa was applied thereto. The results of the maximum deformation amount structure simulation of Experimental Example 1 are shown in FIG. 6, and the results of the maximum deformation amount structure simulation of Experimental Example 2 are shown in FIG. 7. In addition, the results of the maximum stress structure simulation of Experimental Example 1 are shown in FIG. 8, and the results of the maximum stress structure simulation of Experimental Example 2 are shown in FIG. 9.

Structure simulation was performed using Meshfree, which is a CAE tool developed by Midas IT Co., Ltd. Three-dimensional shapes were implemented using SolidWorks, which is a CAD program, and then structure simulation was performed on the respective shapes using Meshfree.

Referring to FIGS. 6 and 7, the maximum deformation amount of Experimental Example 1 is about 0.03 mm, and the maximum deformation amount of Experimental Example 2 is about 0.04 mm.

Referring to FIGS. 8 and 9, the maximum stress of Experimental Example 1 is about 8.8 $N/mm^2$, and the maximum stress of Experimental Example 2 is about 11.3 $N/mm^2$.

Experimental Example 1, in which the embossed pattern was formed on the entirety of the sealed portion, exhibited a maximum deformation amount smaller than the maximum deformation amount of Experimental Example 2, in which the sealed portion was flat, and therefore it can be seen that the pouch-shaped battery cell having the embossed pattern formed on the entirety of the sealed portion thereof has a harder structure having a small deformation amount with respect to an increase in internal pressure.

In addition, when the same internal pressure was applied, the maximum stress of Experimental Example 1 was measured to be smaller than the maximum stress of Experimental Example 2. Consequently, it can be seen that the pouch-shaped battery cell having the embossed pattern formed on the entirety of the sealed portion thereof is capable of withstanding larger internal pressure.

It can be seen from the above results that, when the embossed pattern is formed on the entirety of the sealed portion of the pouch-shaped battery cell, sealing force is increased.

<Maximum Deformation Amount and Maximum Stress Measurement 2>

The maximum deformation amount and the maximum stress of each of the battery cells manufactured according to Experimental Example 1 and Experimental Example 2 were measured while an internal pressure of 0.1 MPa was applied thereto. The results of the maximum deformation amount structure simulation of Experimental Example 1 are shown in FIG. 10, and the results of the maximum deformation amount structure simulation of Experimental Example 2 are shown in FIG. 11. In addition, the results of the maximum stress structure simulation of Experimental Example 1 are shown in FIG. 12, and the results of the maximum stress structure simulation of Experimental Example 2 are shown in FIG. 13.

Structure simulation was performed using the same method as in the maximum deformation amount and maximum stress measurement of Experimental Example 1 and Experimental Example 2.

Referring to FIGS. 10 to 13, the maximum deformation amount of Experimental Example 1 is about 0.25 mm, and the maximum deformation amount of Experimental Example 2 is about 0.37 mm. The maximum stress of Experimental Example 1 is about 84 $N/mm^2$, and the maximum stress of Experimental Example 2 is about 111 $N/mm^2$.

Experimental Example 1, in which the embossed pattern was formed on the entirety of the sealed portion, exhibited the maximum deformation amount and the maximum stress smaller than the maximum deformation amount and the maximum stress of Experimental Example 2, in which the sealed portion was flat.

When the embossed pattern is formed on the entirety of the sealed portion of the pouch-shaped battery cell, therefore, the pouch-shaped battery cell may have a harder structure, and sealing force may be maintained even when internal pressure is more greatly increased.

Those skilled in the art to which the present invention pertains will appreciate that various applications and modifications are possible within the category of the present invention based on the above description.

DESCRIPTION OF REFERENCE SYMBOLS

100, 200: Battery cells
110, 210: Pouch-shaped battery cases
111, 211: Upper cases
112, 212: Lower cases
114, 214: Electrode assembly receiving portions
115, 215: Sealed portions
116, 216: Embossed patterns
120, 220: Electrode leads
301, 401: Sealing surfaces
310, 410: Upper sealing blocks
320, 420: Lower sealing blocks
330, 430: Protrusions
340, 440: Recesses
H: Overall length direction
W: Overall width direction

The invention claimed is:

1. A battery cell comprising a pouch-shaped battery case configured to receive an electrode assembly therein, wherein the pouch-shaped battery case includes a plurality of side walls including at least one side wall from which no electrode lead protrudes, and at least one electrode protrusion wall configured to have an electrode lead extend from an interior to an exterior of the pouch-shaped battery case, and a sealed portion provided along the plurality of side walls at an outer periphery of the pouch, thereby surrounding an electrode assembly receiving portion, an electrode lead extending from the sealed portion; and an embossed pattern including a plurality of reliefs and intaglios formed on the sealed portion in all directions, wherein intervals of the embossed pattern formed on the sealing portion along the at least one electrode protrusion wall of the pouch-shaped battery case is less than intervals of the embossed pattern formed on the sealed portion along side walls of the plurality of sidewalls of the pouch-shaped battery case from which no electrode lead protrudes, and wherein the intervals of the embossed pattern are defined as a distance between adjacent reliefs and intaglios of the plurality of reliefs and intaglios of the embossed pattern.

2. The battery cell according to claim 1, wherein the embossed pattern is formed such that reliefs of the plurality of reliefs and intaglios when viewed from above the sealed portion are intaglios of the plurality of reliefs and intaglios when viewed from under the sealed portion and such that intaglios of the plurality of reliefs and intaglios when viewed from above the sealed portion are reliefs of the plurality of reliefs and intaglios when viewed from under the sealed portion.

3. The battery cell according to claim 2, wherein the embossed pattern is formed such that reliefs of the plurality of reliefs and intaglios and intaglios of the plurality of reliefs and intaglios are alternately repeated when viewed from above the sealed portion.

4. The battery cell according to claim 1, wherein corners of the embossed pattern are defined by an intersection along the sealed portion in which the side walls of the plurality of sidewalls of the pouch-shaped battery case in which no electrode lead protrudes contacts the at least one electrode protrusion wall, and wherein the embossed pattern between corners is uniform.

5. The battery cell according to claim 1, wherein a vertical section of the embossed pattern is polygonal, semicircular, or semielliptical.

6. A sealing block for manufacturing the battery cell according to claim 1, the sealing block comprising:

an upper sealing block disposed above the sealed portion of the pouch-shaped battery cell; and a lower sealing block disposed under the sealed portion of the pouch-shaped battery cell, wherein the upper sealing block and the lower sealing block are provided with recesses and protrusions configured to compress the sealed portion between each other at positions at which the upper sealing block and the lower sealing block correspond to each other.

7. The sealing block according to claim 6, wherein the protrusions protrude toward the sealed portion of the pouch-shaped battery cell.

8. The sealing block according to claim 6, wherein the protrusions are configured such that shapes protruding upwards toward the sealed portion of the pouch-shaped battery cell and shapes protruding downwards toward the sealed portion of the pouch-shaped battery cell are alternately repeatedly arranged.

9. A battery module comprising the battery cell according to claim 1 as a unit battery.

10. A sealing block for manufacturing a battery cell comprising a pouch-shaped battery case having an embossed portion formed on a sealed portion, the sealing block comprising:

an upper sealing block including a plurality of upper blocks including at least one electrode protrusion upper block configured to have an electrode lead extend from an interior to an exterior of the pouch-shaped battery case and at least one upper block of the plurality of upper blocks from which no electrode protrudes, the upper sealing block being configured to be disposed above the sealed portion of the pouch-shaped battery cell; and a lower sealing block including a plurality of lower blocks, including at least one electrode protrusion lower block configured to have an electrode lead extend from the interior to the exterior of the pouch-shaped battery case and at least one lower block of the plurality of lower blocks from which no electrode protrudes, the lower sealing block being configured to be disposed under the sealed portion of the pouch-shaped battery cell, wherein the upper sealing block and the lower sealing block are provided with a plurality of recesses and protrusions configured to compress the sealed portion between each other at positions at which the upper sealing block and the lower sealing block correspond to each other, wherein intervals of the plurality of pairs of recesses and protrusions are formed on the sealed portion along the at least one electrode protrusion upper block and the at least one electrode protrusion lower block are less than intervals of the plurality of recesses and protrusions formed on the at least one upper block of the plurality of upper blocks from which no electrode lead protrudes and on the lower blocks of the plurality of lower blocks from which no electrode lead protrudes, and wherein the intervals of the plurality of pairs of recesses and protrusions are defined as a distance between adjacent recesses and protrusions of the plurality of recesses and protrusions.

11. The battery cell according to claim 1, wherein the sealed portion is flat along the portion at which the electrode lead protrudes from the at least one electrode protrusion wall.

* * * * *